Patented July 23, 1929.

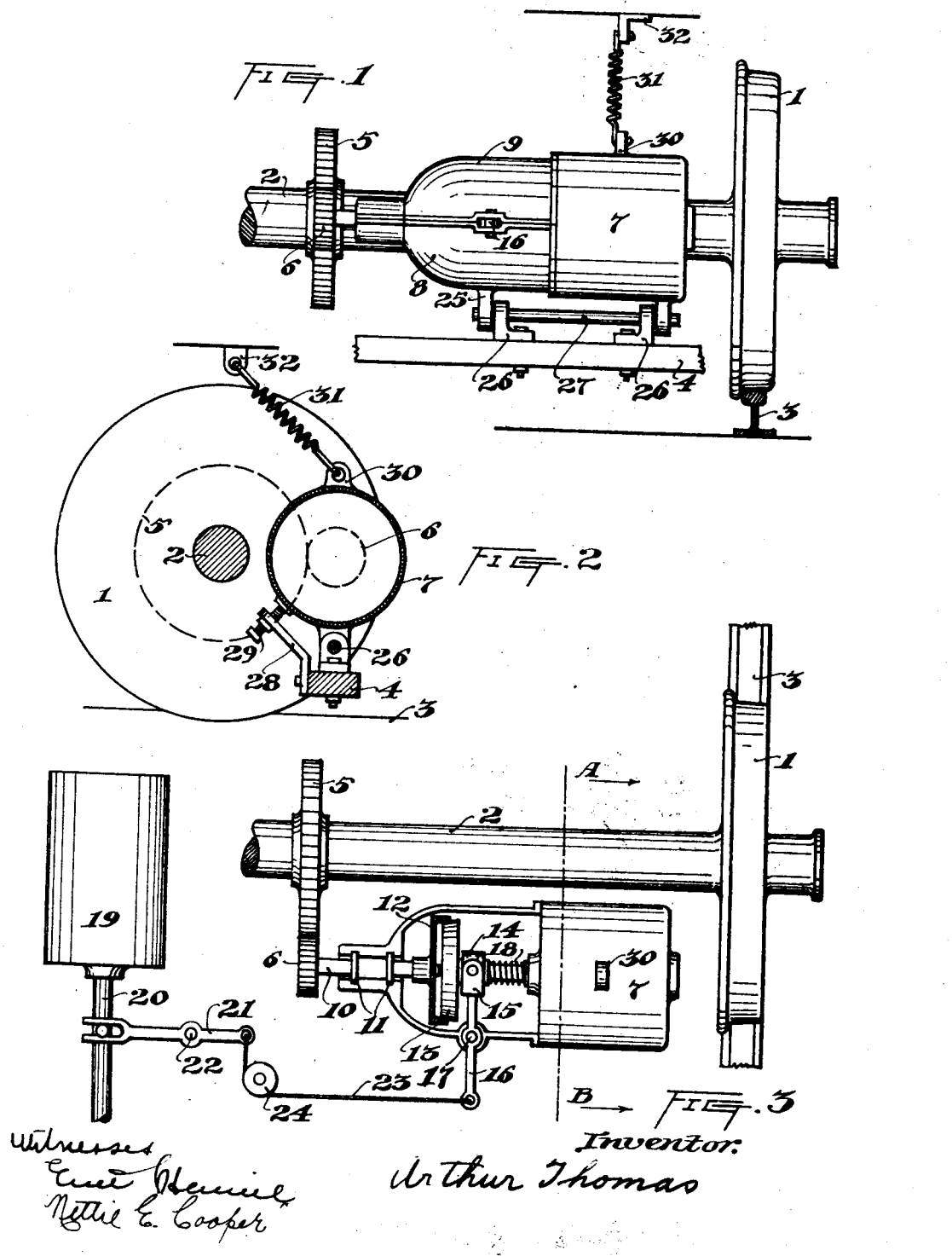

1,721,677

UNITED STATES PATENT OFFICE.

ARTHUR THOMAS, OF CALGARY, ALBERTA, CANADA.

DRIVE AND CONTROL OF MOTOR GENERATORS.

Application filed March 29, 1928. Serial No. 265,758.

My invention relates to improvements in a device for driving electric generators from a convenient source of power and the objects of my invention are; first, to provide a simple means of taking up the shock in starting the electric generator, and further in connection with railway vehicles of co-ordinating the starting and stopping of the generator with the movement of the air brake.

I attain these objects by the mechanism illustrated in the accompanying drawings, in which,—

Fig. 1 is an elevation of the generator and its driving gears.

Fig. 2 is a section taken on line A—B of Fig. 3 the armature of the generator not being shown.

Fig. 3 is a plan of the device with the top cover of the generator extension removed and one of the clutch members sectioned.

Similar numerals refer to similar parts throughout the several views.

Referring to the drawings:—

1 is a wheel of a railway vehicle having an axle 2, one of the rails 3 being indicated. In relation to the wheel is a portion of the truck frame 4. Mounted on the axle 2 is the driving gear 5 and in mesh therewith the driven gear 6. Co-axial with the gear 6 is the electric generator 7 enclosed in a suitable housing which housing has an extension thereon formed in two portions 8 and 9. Carried by the housing parts 8 and 9 is the shaft 10 fixed to the gear 6 the said shaft being mounted in ball thrust bearings 11 and having mounted on the opposite end to the driven gear 6 the clutch member 12. In relation to clutch member 12 is the complementary clutch member 13 which is carried upon a splined extension of the generator shaft. 14 comprises a clutch collar with which is engaged the clutch shifting fork 15 actuated by the shifting lever 16 which is pivoted at 17 on the generator housing extension. The clutch is influenced to engagement by the spring 18. The clutch mentioned is of ordinary construction and for which no novelty is claimed in itself.

Adjacent to the wheels of the vehicle is the air brake cylinder 19 having a piston rod 20 which actuates a system of levers when operated to set the brakes of the vehicle on and off. 21 is a lever pivoted at 22 and actuated by the piston rod 20. Intermediate the lever 21 and the clutch shifting arm 16 is a cable 23 passing over a pulley 24. It is usually necessary to allow a little slack in the cable 23 to counteract the partial operation of the clutch through the swivelling action of the truck framework when the vehicle is turning on a curve. It will be seen that an outward motion of piston rod 20 will actuate the clutch to disengagement. While a special lever 21 is shown on the drawings, I contemplate the attachment of the cable 23 to any suitable moving part of the air brake mechanism. This usually consists of a system of levers the most convenient one of which would be used, pulleys being arranged to change the direction of the cable 23 as required.

On the generator 7 and extension thereof are formed the brackets 25 and on the frame 4 are fastened the brackets 26, a pin 27 engaging all of the rackets 25 and 26 forms a hinge upon which the whole generator assembly has pivotal motion. Also supported on frame 4 is the bracket 28 through which passes at its upper end the set screw 29 which bears upon the casing of generator 7 and limits its motion towards the axle of the carriage wheel. An adjustment of the mesh of gears 5 and 6 is obtained by the set screw 29. To a lug 30 on the generator 7 is attached a tension spring 31 the free end of which is secured to a hook 32 in a convenient portion of the truck frame. The spring 31 holds the generator against the adjusting screw 29 but at the same time yields outwardly to allow for any inequalities in the gears 5 and 6 or any motion of the axle 2.

While the device is indicated for use in a railway carriage where an air brake is employed, it could also be used in other vehicles where different braking mechanism is employed.

I also contemplate a drive between the axle and the generator shaft by a belt or by a sprocket chain. I illustrate only the simplest form of my device in which I use spur gears. No invention is claimed in the construction of the clutch but it is evident that a disc clutch or other form of clutch than that shown would be suitable.

In use the device is adjusted so that when the brakes are set on the clutch is disengaged and the generator comes to rest. When the brakes are released prior to the vehicle being set in motion the generator is again brought into action by the clutch being engaged and as this action is gradual the generator is saved from shock through the gradual take up of the clutch. When the brakes are used to retard the motion of the vehicle only the generator retains by its momentum a speed in proportion to that of the vehicle and the re-engagement of the clutch when the brakes are released is not attended by any shock sufficient to injure the generator.

What I do claim as my invention, and desire to secure by Letters Patent is:—

1. The combination with a vehicle having braking mechanism, a driving gear on the axle of the vehicle wheels, a driven gear in relation therewith, an electric generator in relation to the driven gear, a clutch intermediate the driven gear and the said generator, means for actuating the clutch comprising a cable intermediate a moving part of the braking mechanism and a clutch shifting lever in engagement with the said clutch, the whole adapted that when the brakes are set on the clutch is disengaged.

2. The combination with a railway carriage having an air brake mechanism, an electric generator pivotally mounted in relation to the axle of the carriage, a driving gear on the said axle, a driven gear in relation therewith, a clutch mechanism intermediate the said driven gear and the generator adapted to drive the generator when the clutch is engaged, means for actuating the clutch comprising a cable intermediate a moving part of the braking mechanism and a clutch shifting lever, the whole adapted that the clutch is disengaged when the brakes are set on.

3. The combination with a railway carriage having a braking mechanism, an electric generator pivotally mounted in relation to the axle of the carriage, a driving gear mounted on the said axle, a driven gear in relation therewith, a clutch mechanism intermediate the said driven gear and the generator, a clutch shifting lever engaged with the said clutch, means for co-ordinating the clutch disengagement with the setting of the brakes, comprising a cable intermediate a moving part of the brake mechanism and the clutch shifting lever mentioned.

4. The combination with a railway carriage having a braking mechanism, an electric generator pivotally mounted in relation to the axle of the carriage, a driving gear mounted on the said axle, a driven gear in relation therewith, a clutch mechanism intermediate the said driven gear and the generator, a clutch shifting lever engaged with the said clutch, means for co-ordinating the clutch disengagement with the setting of the brakes, screw means for adjusting the mesh of the driving and driven gears and spring means for influencing the pivotal motion of the said generator.

5. The combination with a railway carriage having a braking mechanism, an electric generator in relation to the axle of the said carriage, means for driving the said generator from the axle when the carriage is in motion, a clutch mechanism intermediate the driving means and the generator, and means for co-ordinating the disengagement of the clutch with the setting of the brakes.

Calgary, Alberta, 23rd March, 1928.

ARTHUR THOMAS.